(12) United States Patent
Kaku et al.

(10) Patent No.: US 6,705,427 B2
(45) Date of Patent: Mar. 16, 2004

(54) EXHAUST SYSTEM SUPPORT STRUCTURE

(75) Inventors: Youichi Kaku, Yokohama (JP); Naoki Uchida, Hadano (JP); Hidefumi Mihara, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 10/046,392

(22) Filed: Jan. 16, 2002

(65) Prior Publication Data

US 2002/0108808 A1 Aug. 15, 2002

(30) Foreign Application Priority Data

Feb. 9, 2001 (JP) ......................................... 2001-033643

(51) Int. Cl.[7] ............................................... F16F 15/00
(52) U.S. Cl. ...................... 181/209; 181/208; 181/207; 248/562; 248/638
(58) Field of Search ................................. 181/207–209; 248/562, 638, 610–612, 581, 589, 58

(56) References Cited

U.S. PATENT DOCUMENTS 6,250,615 B1 * 6/2001 Leibach .................. 267/140.13

FOREIGN PATENT DOCUMENTS

| JP | 04039439 A | * | 2/1992 | ............ F16F/15/08 |
| JP | 4308314 A | | 10/1992 | |

* cited by examiner

*Primary Examiner*—Robert D Nappi
*Assistant Examiner*—Renata McCloud
(74) *Attorney, Agent, or Firm*—Shinjyu Global IP Counselors, LLP.

(57) ABSTRACT

An exhaust system support structure is provided with a vehicle body bracket, a vibration insulating member and an exhaust bracket. The vehicle body bracket has a base part that is coupled to a vehicle body member, and a pair of support parts extending from the base part. The vibration insulating member is coupled between the support parts. The exhaust bracket has a first end coupled to the vibration insulating member and a second end coupled to an exhaust system member. The vibration insulating member includes a housing part that houses the first end of the exhaust bracket. The support parts can be linked together with a linking part. Vibrational displacement of the vibration insulating member is suppressed by a regulating body protruding from the vehicle body bracket side of the vibration insulating member and a regulating body protruding from the linking part side of the vibration insulating member.

19 Claims, 12 Drawing Sheets

EXHAUST SYSTEM SUPPORT STRUCTURE

BACKGROUND OF THE INVENTION

1. Field of the Invention

This invention relates to an exhaust system support structure that supports an exhaust system, (e.g., a muffler or silencer, an exhaust pipe, etc.) to a vehicle body member. More specifically, the present invention relates to an exhaust system support structure having an vehicle body bracket and a vibration insulating member that are arranged to support the exhaust system to the vehicle body and isolate vibrations from exhaust system to the vehicle body.

2. Background Information

An example of an exhaust system support structure is disclosed in Japanese Laid-Open Patent Publication No. 4-308314. In this exhaust system support structure, a vehicle body bracket has a connecting part mounted to a vehicle body member and an arm part extending downwardly from the connecting part for fastening to an exhaust bracket thereto by a rubber insulator. The rubber insulator is attached to the lower free end of the arm part and an upper free end of the exhaust bracket. The lower free end of the arm part has a round-rod shaped engaging part that extends in a sideways manner. The exhaust bracket, which is fixed to the exhaust system, extends upwardly from the exhaust system. The upper free end of the exhaust bracket has a round-rod shaped engaging part that extends in a sideways manner. These engaging parts are inserted into round holes of the rubber insulator. Thus, the exhaust system is suspended from the vehicle body bracket by the insulator. This exhaust system support structure has a special property in that vibrations occurring in the exhaust system are absorbed by the insulator and are not readily transmitted to the vehicle body member.

While the above exhaust system support structure works well, there still exists a need for an improved an exhaust system support structure. This invention addresses this need in the art as well as other needs, which will become apparent to those skilled in the art from this disclosure.

SUMMARY OF THE INVENTION

It has been discovered that the aforementioned exhaust system support structure has a long vertical dimension. Specifically, the exhaust system support structure has a long vertical dimension because the arm part of the vehicle body bracket is formed below the connecting part of the vehicle body bracket, and the insulator is mounted vertically between the arm part of the vehicle body bracket and the engaging part of the exhaust bracket. As a result, the layout of the exhaust system support structure is restricted. Furthermore, vibrations from the exhaust system would be better absorbed and prevented from reaching the vehicle body member if the rigidity of the insulator were smaller. However, in the aforementioned exhaust system support structure, the exhaust system is suspended from the vehicle body bracket by way of the insulator. Consequently, the insulator must have the strength to support the weight of the exhaust system. Thus, a limit is imposed on how small the rigidity can be for the insulator. In particular, in the aforementioned exhaust system support structure, the insulator is under tension in the vertical direction, and thus, the insulator needs to have a high tensile strength, which limits the reduction of the rigidity.

The present invention was developed in order to resolve these various problems. One object of the present invention is to provide an exhaust system support structure that has a short dimension in the vertical direction, and that can absorb vibrations from the exhaust system and efficiently prevent the vibrations from reaching the vehicle body member by having an insulator with a small rigidity.

In order to achieve the aforementioned object, an exhaust system support structure is provided with a vehicle body bracket, a vibration insulating member and an exhaust bracket. The vehicle body bracket includes a base part that is configured to be coupled to a vehicle body member, and a pair of support parts extending from the base part. The vibration insulating member is coupled between the support parts of the vehicle body bracket. The exhaust bracket includes a first end coupled to the vibration insulating member and a second end configured to be coupled to an exhaust system member. The vibration insulating member includes a housing part that houses the first end of the exhaust bracket.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Referring initially to FIGS. 1–5, an exhaust system support structure is illustrated in accordance with a first embodiment of the present invention. As explained below, the exhaust system support structure of the present invention is configured so that the overall vertical dimension can be made shorter and the isolation of the vibrations can be improved.

Figure 1:
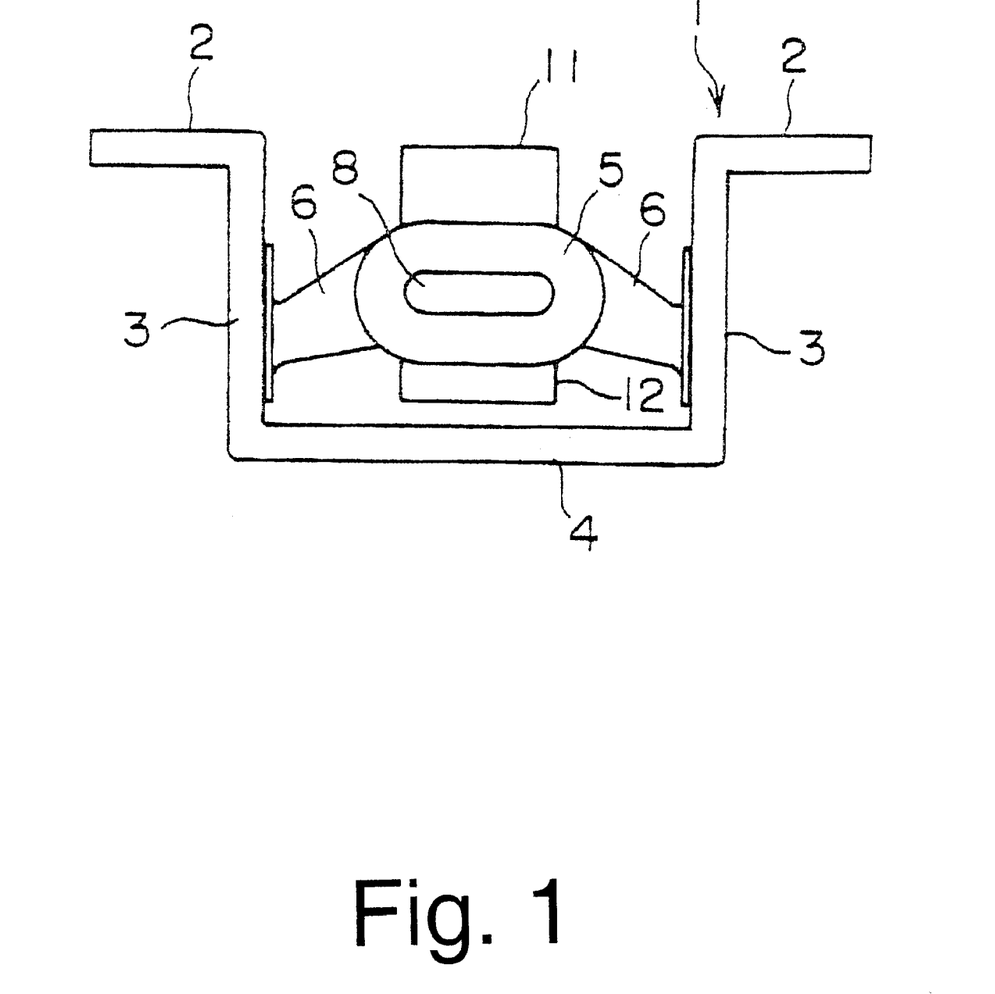
FIG. 1 is a front elevational view of a vehicle body bracket of an exhaust system support structure in accordance with a first embodiment of the present invention.
Figure 2:
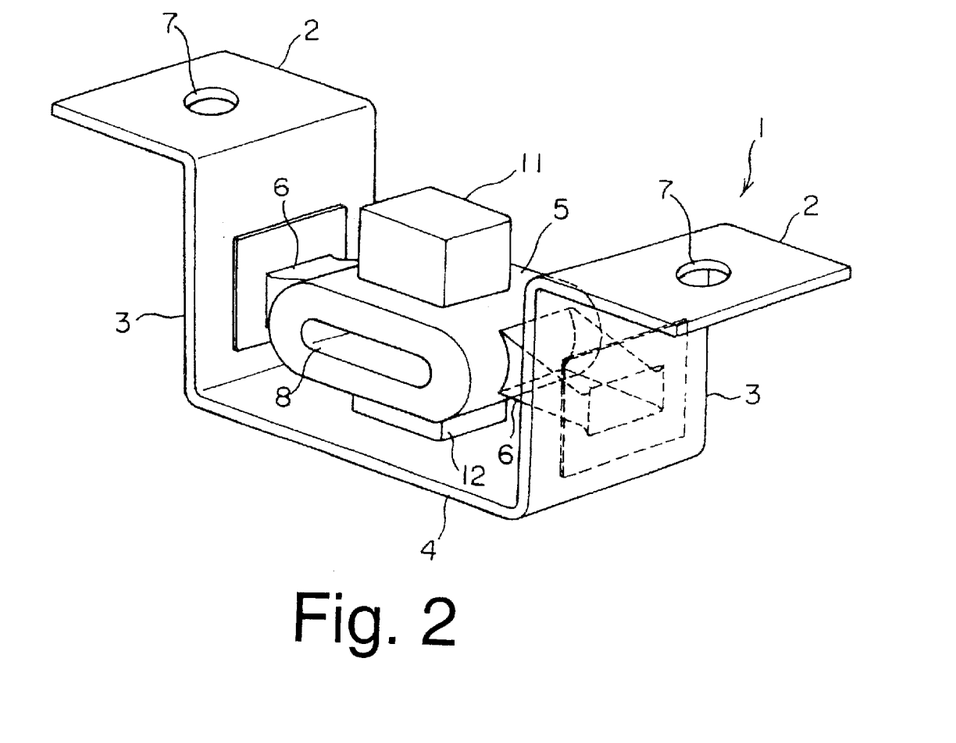
FIG. 2 is an enlarged perspective view of the vehicle body bracket shown in FIG. 1.
Figure 5:
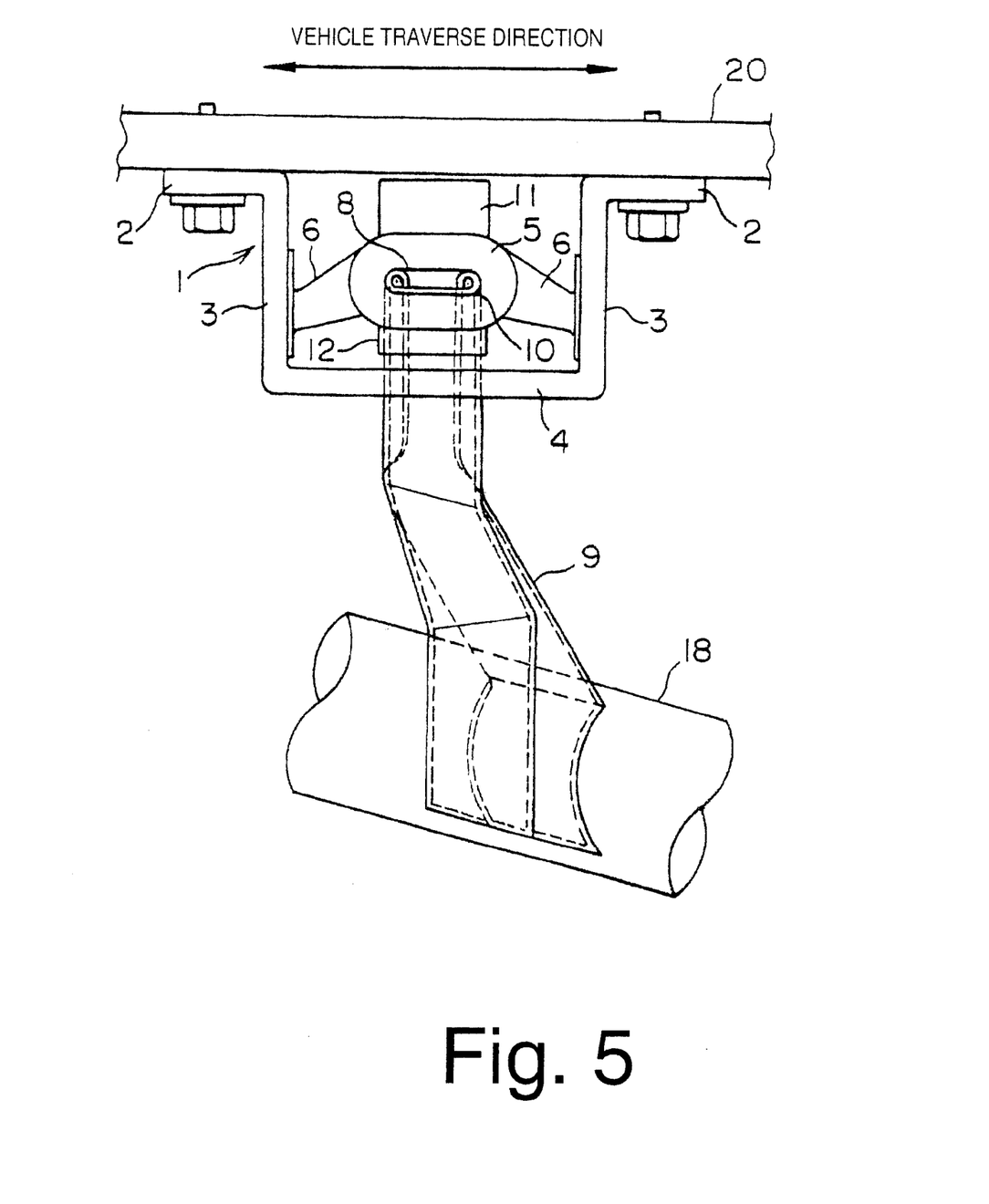
FIG. 5 is an explanatory view of the vehicle body bracket shown in FIGS. 1–3 mounted to vehicle body member and supporting a portion of an exhaust pipe by an exhaust bracket of FIGS. 3 and 4.

The exhaust system support structure has a vehicle body bracket 1 that is fixedly coupled to a vehicle body member 20 (see FIG. 5). In this first embodiment, the vehicle body bracket 1 is formed from a piece of sheet material that is bent into a rectangular U-shaped member with a pair of end flanges 2 extending from the ends of the open side of the U-shaped member. The U-shaped member of the vehicle body bracket 1 also includes two opposing side support parts 3 and a bottom side linking part 4 that is connected to the lower ends of the support parts 3. The end flanges 2 are bent at right angles toward the outside of the upper ends of the support parts 3 of the vehicle body bracket 1. The end flanges 2 are base parts, which are fixed to the vehicle body member 20 (see FIG. 5).

Figure 20:
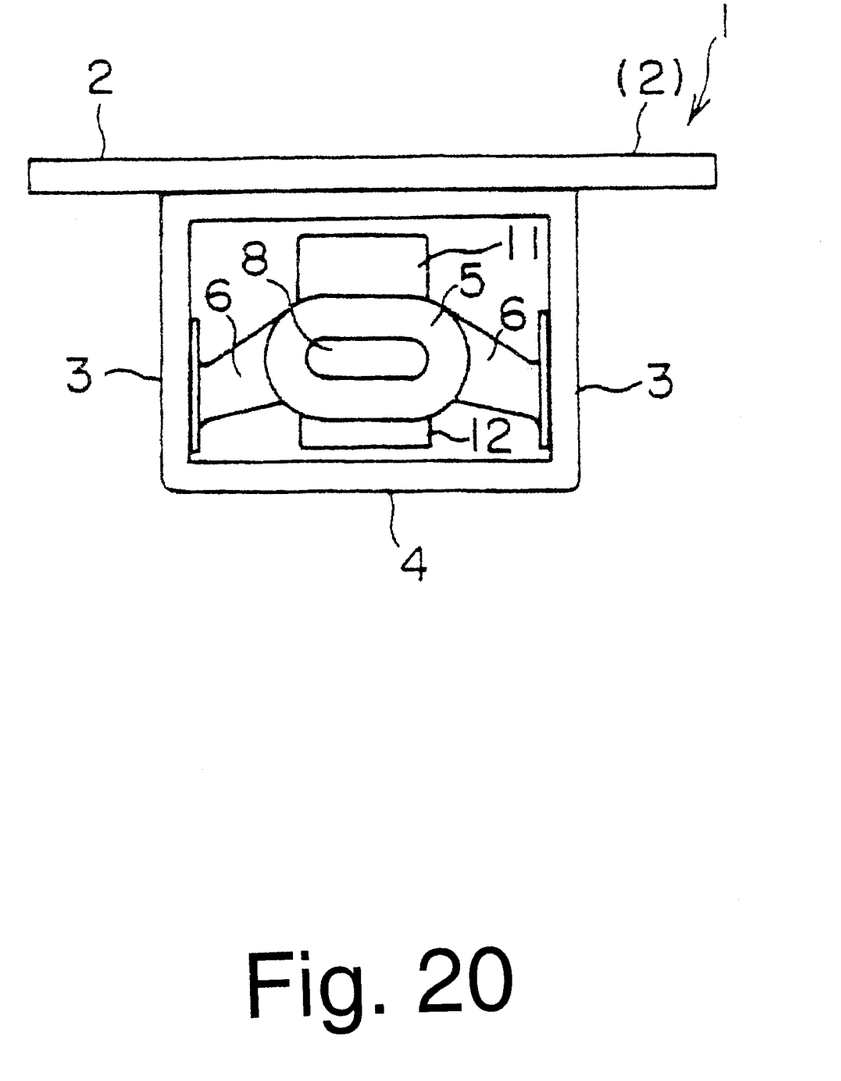
FIG. 20 is a front elevational view of a modified vehicle body bracket of an exhaust system support structure in accordance with the present invention.

An insulator or vibration insulating member 5 is mounted between the side support parts 3. The vibration insulating member 5 is a rubber member that has an oval cross sectional shape. Both ends of the vibration insulating member 5 in the lengthwise direction of the oval are provided with extended connecting parts 6. The outside ends of the connecting parts 6 are fixed to the inside surfaces of the support parts 3 of the vehicle body bracket 1. The vehicle body bracket can also be formed as shown in FIG. 20, i.e., the base parts 2 are formed from a single flat plate that is welded to one side of a member having a rectangular cross sectional shape as explained below.

Figure 3:
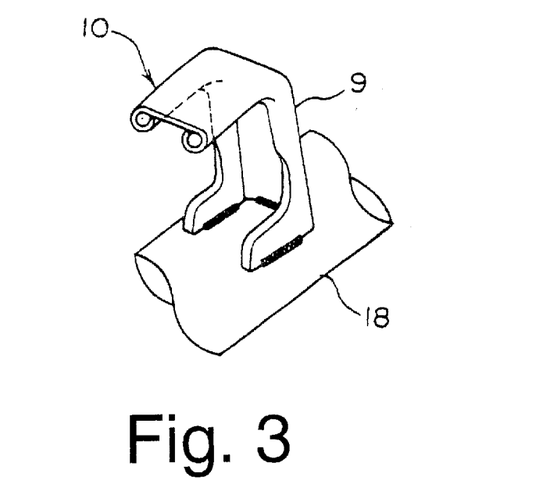
FIG. 3 is a perspective view of a portion of an exhaust pipe with an exhaust bracket that is adapted to be coupled to the vehicle body bracket shown in FIGS. 1 and 2.
Figure 4:
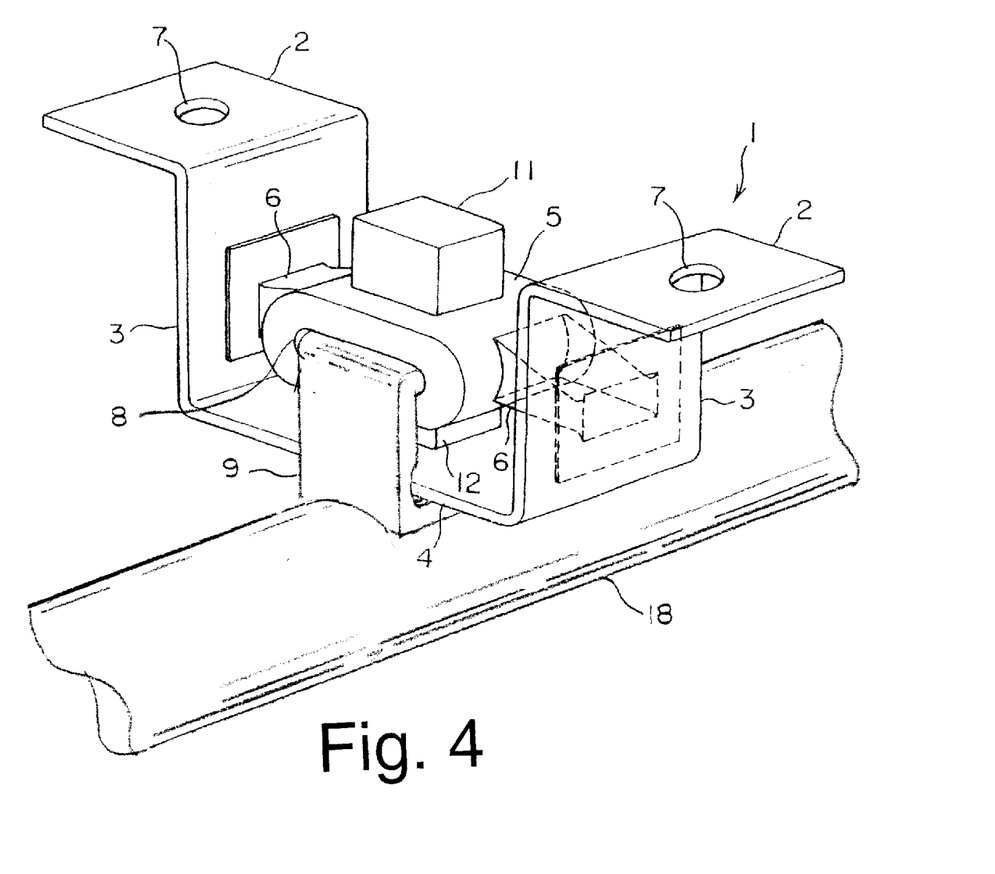
FIG. 4 is a perspective view of the vehicle body bracket shown in FIGS. 1 and 2 with the exhaust bracket of FIG. 3 coupled thereto.

Inside the vibration insulating member 5, which has an oval cross sectional shape, is formed a housing part 8 that is a concentric oval bore or passage. As shown in FIGS. 3 and 4, an exhaust bracket 9 having a rectangular U-shaped cross sectional shape is welded in an upward orientation to an exhaust pipe 18. The upper end part of the exhaust bracket 9 is bent sideways and both lateral edges of the bent portion are rounded inward to form a generally oval-shaped engaging part 10 that is housed inside the housing part or passage 8. FIGS. 4 and 5 illustrate the engaging part 10 of the exhaust bracket 9 housed inside the oval housing part or passage 8 of the vibration insulating member 5. Thus, the vehicle body bracket 1 and the vibration insulating member 5 should be mounted such that the pair of support parts 3 line up in the traverse direction of the vehicle. When mounted in this manner, the exhaust pipe 18, i.e., part of the exhaust system, can be effectively prevented from undulating in the traverse direction and also prevented from undulating in a rotational manner about a center at the location where the exhaust system is mounted to the vibration insulating member 5. Furthermore, since the engaging part 10 of the exhaust bracket 9 engages with the oval housing part 8 of the vibration insulating member 5, the rotational displacement of the exhaust bracket 9 with respect to the vibration insulating member 5 is prevented. Consequently, undulation of the exhaust system can be prevented.

This arrangement of the vibration insulating member 5 between the support parts 3 of the vehicle body bracket 1 results in a short overall vertical dimension of the exhaust system support structure. Furthermore, since the vibration insulating member 5 is supported by the vehicle body bracket 1 between the pair of support parts 3, the weight of the exhaust system is supported by the pair of support parts 3 and the tensile forces acting on the vibration insulating member 5 are shared between the pair of support parts 3. Therefore, the tensile strength of the vibration insulating member 5 can be reduced and the rigidity of the vibration insulating member 5 can likewise be reduced so that vibrations from the exhaust system can be absorbed and prevented from reaching the vehicle body member.

Additionally, in this embodiment, a first regulating body 11 protrudes from the vehicle body member side of the vibration insulating member 5, i.e., the part of the insulator that faces the vehicle body member 20. When large vibrations in the vertical direction are inputted from the exhaust system, the first regulating body 11 touches against the vehicle body member so that there is no further vibrational displacement of the vibration insulating member 5. As a result, the durability of the vibration insulating member 5 can be improved and the locations where the vibration insulating member 5 and vehicle body bracket 1 can be attached to the vehicle body member 20 are increased.

Additionally, in this embodiment, a second regulating body 12 protrudes from the linking part side of the vibration insulating member 5, i.e., the part of the insulator that faces the linking part 4. When large vibrations in the vertical direction are inputted from the exhaust system, the second regulating body 12 touches against the linking part 4 and there is no further vibrational displacement of the vibration insulating member 5. As a result, the durability of the insulator can be improved the locations where the vibration insulating member 5 and vehicle body bracket 1 can be attached to the vehicle body member 20 are increased.

Thus, these regulating bodies 11 and 12 touch against the vehicle body member 20 or the linking part 4 when the exhaust system vibrates in the vertical direction and serve to keep the vibration insulating member 5 from undergoing any further vibrational displacement. As a result, declination of the durability of the vibration insulating member 5 can be suppressed and effects on the locations where the vibration insulating member 5 and the vehicle body bracket 1 are attached together can be suppressed.

Even if there is no the second regulating body 12, if the vibration insulating member 5 and the linking part 4 are in close proximity then the vibration insulating member 5 itself will touch against the linking part 4 when large vibrational input occurs the vibration insulating member 5 will not undergo any further vibrational displacement. Thus, in a similar manner, declination of the durability of the vibration insulating member 5 can be suppressed and effects on the locations where the vibration insulating member 5 and the vehicle body bracket 1 are attached together can be suppressed.

Second Embodiment

Figure 6:
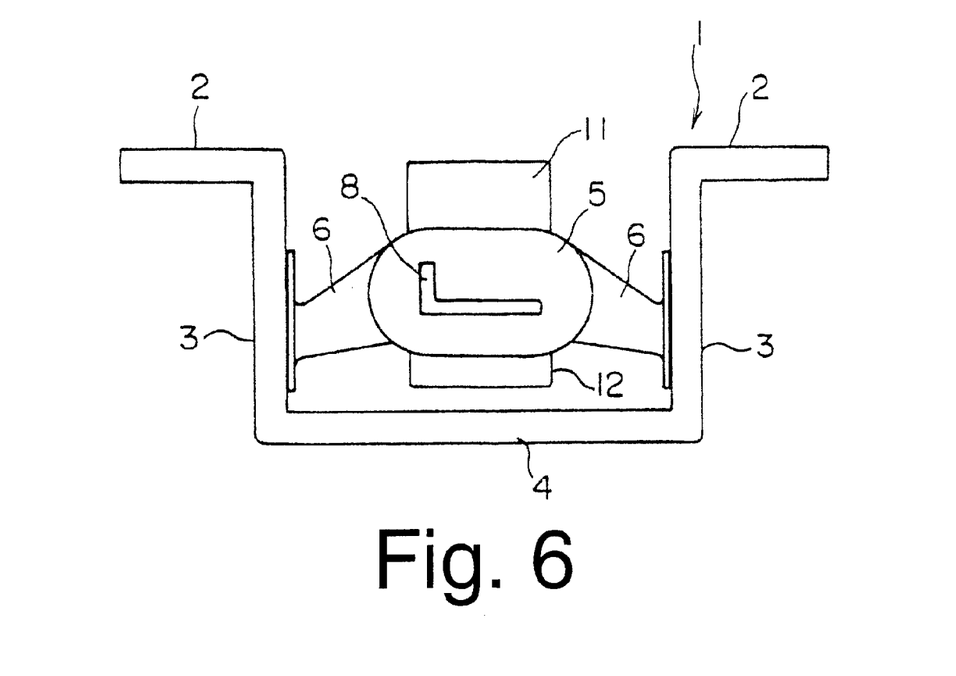
FIG. 6 is a front elevational view of a vehicle body bracket of an exhaust system support structure in accordance with a second embodiment of the present invention.
Figure 7:
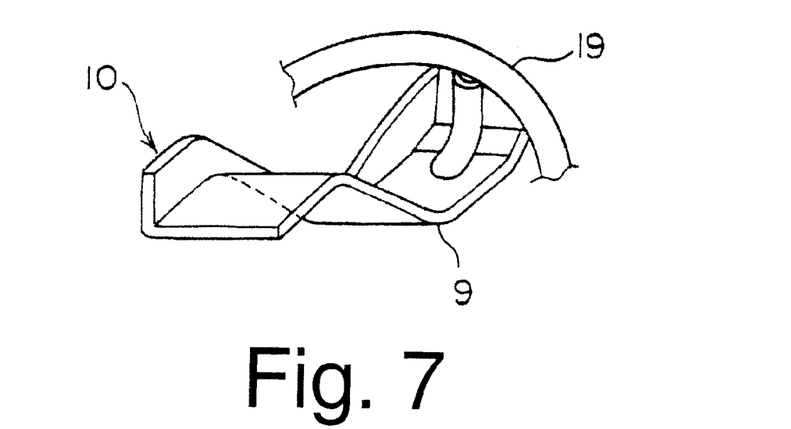
FIG. 7 is a perspective view of a portion of a silencer coupled to an exhaust bracket that is used with the vehicle body bracket shown in FIG. 6 in accordance with the second embodiment of the present invention.

Referring now to FIGS. 6 and 7, an exhaust system support structure in accordance with a second embodiment will now be explained. In view of the similarity between the first and second embodiments, the parts of the second embodiment that are substantially identical to the parts of the first embodiment will be given the same reference numerals as the parts of the first embodiment. Moreover, the descriptions of the parts of the second embodiment that are substantially identical to the parts of the first embodiment will be omitted for the sake of brevity.

The vehicle body bracket 1 and the vibration insulating member 5 are almost the same in this second embodiment as in the first embodiment, but the housing part or passage 8 of the vibration insulating member 5 is L-shaped. Likewise, the forward end of press-formed the exhaust bracket that is mounted to the silencer 19 is bent in an L-shaped manner to form the engaging part 10. Thus, the engaging part 10 of the L-shaped exhaust bracket 9 is housed in the L-shaped housing part 8 of the vibration insulating member 5 such that the exhaust bracket 9, i.e., the exhaust system, is mounted to the vibration insulating member 5. Here again, since the engaging part 10 of the exhaust bracket 9 engages with the L-shaped housing part 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Third Embodiment

Figure 8:
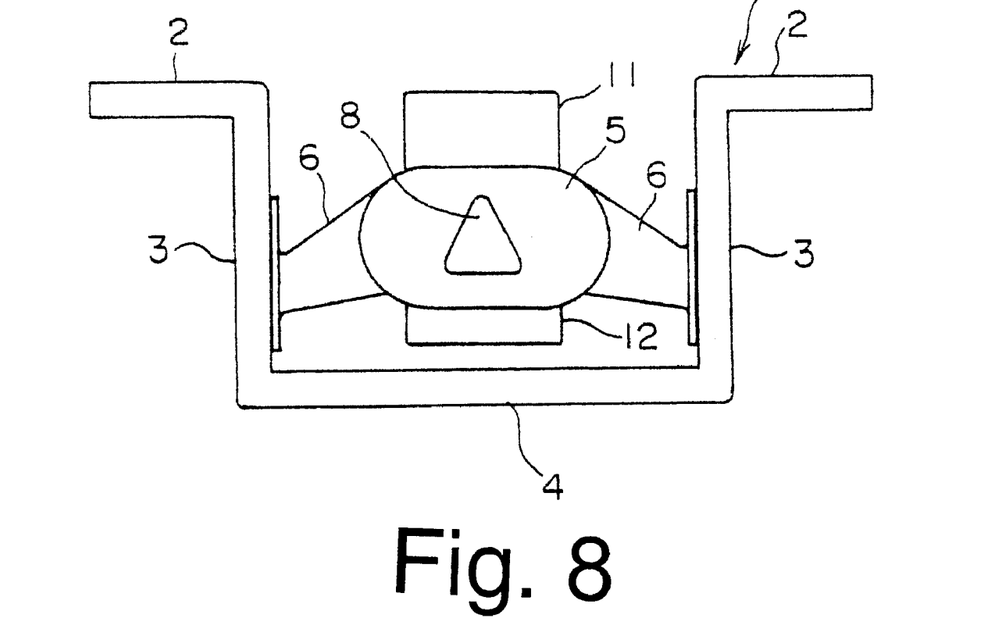
FIG. 8 is a front elevational view of a vehicle body bracket of an exhaust system support structure in accordance with a third embodiment of the present invention.
Figure 9:
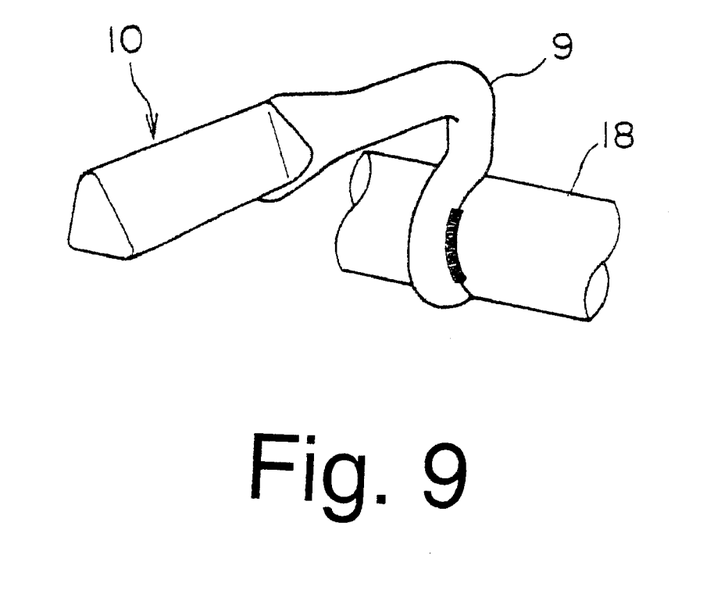
FIG. 9 is a perspective view of a portion of an exhaust pipe coupled to an exhaust bracket that is used with the vehicle body bracket shown in FIG. 8 in accordance with the third embodiment of the present invention.

Referring now to FIGS. 8 and 9, an exhaust system support structure in accordance with a third embodiment will now be explained. In view of the similarity between the first and third embodiments, the parts of the third embodiment that are substantially identical to the parts of the first embodiment will be given the same reference numerals as the parts of the first embodiment. Moreover, the descriptions of the parts of the third embodiment that are substantially identical to the parts of the first embodiment will be omitted for the sake of brevity.

The vehicle body bracket 1 and the vibration insulating member 5 are almost the same in this third embodiment as in the first embodiment, but the housing part 8 of the vibration insulating member 5 is triangular. Likewise, the engaging part 10 has a triangular cross section formed on the upper end of the exhaust bracket 9, which is mounted to exhaust pipe 18. Thus, the engaging part 10 of the exhaust bracket 9, which has a triangular cross sectional shape, is housed in the triangular housing part 8 of the vibration insulating member 5 such that the exhaust bracket 9, i.e., the exhaust system, is mounted to the vibration insulating member 5. Here again, since the engaging part 10 of the exhaust bracket 9 engages with the triangular housing part 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Fourth Embodiment

Figure 10:
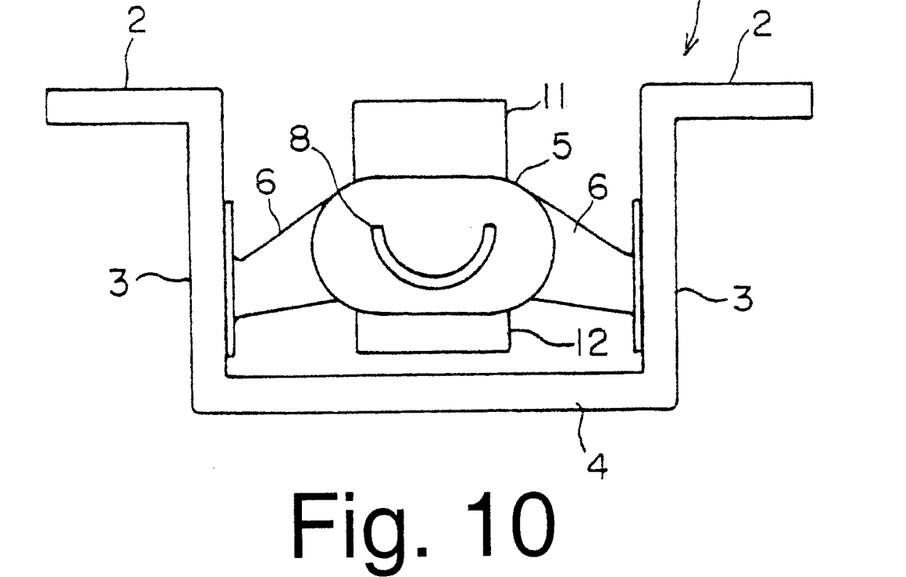
FIG. 10 is a front elevational view of a vehicle body bracket of an exhaust system support structure in accordance with a fourth embodiment of the present invention.
Figure 11:
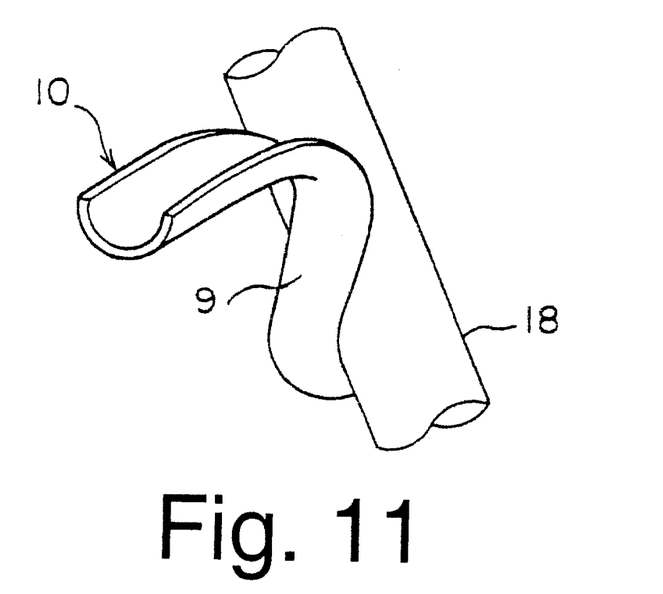
FIG. 11 is a perspective view of a portion of an exhaust pipe coupled to an exhaust bracket that is used with the vehicle body bracket shown in FIG. 10 in accordance with the fourth embodiment of the present invention.

Referring now to FIGS. 10 and 11, an exhaust system support structure in accordance with a fourth embodiment will now be explained. In view of the similarity between the first and fourth embodiments, the parts of the fourth embodiment that are substantially identical to the parts of the first embodiment will be given the same reference numerals as the parts of the first embodiment. Moreover, the descriptions of the parts of the fourth embodiment that are substantially identical to the parts of the first embodiment will be omitted for the sake of brevity.

The vehicle body bracket 1 and the vibration insulating member 5 are almost the same in this fourth embodiment as in the first embodiment, but the housing part 8 of the vibration insulating member 5 is U-shaped. Likewise, the engaging part 10 has a U-shaped cross section formed on the upper end of the exhaust bracket 9, which is mounted to the exhaust pipe 18. Thus, the engaging part 10 of the exhaust bracket 9, which has a U-shaped cross section, is housed in the U-shaped housing part 8 of the vibration insulating member 5 such that the exhaust bracket 9, i.e., the exhaust system, is mounted to the vibration insulating member 5. Here again, since the engaging part 10 of the exhaust bracket 9 engages with the U-shaped housing part or passage 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Fifth Embodiment

Figure 12:
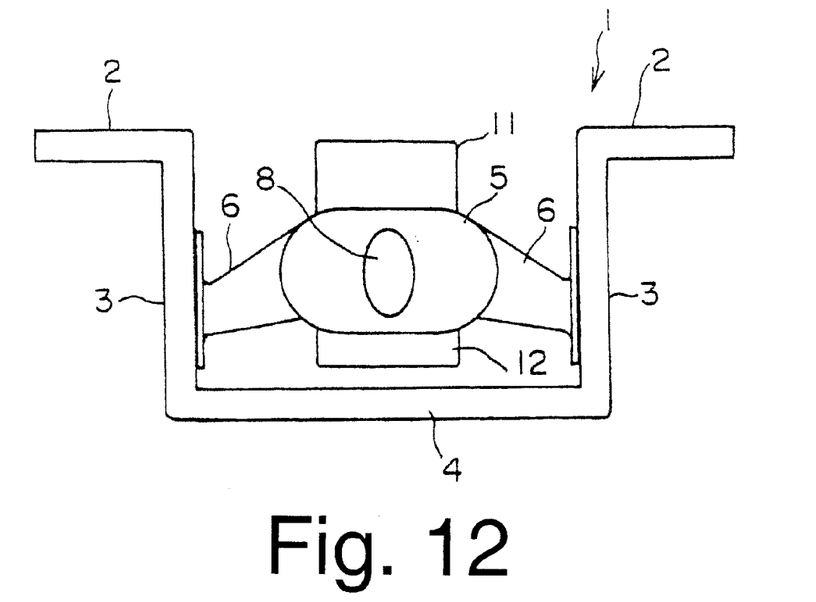
FIG. 12 is a front elevational view of a vehicle body bracket of an exhaust system support structure in accordance with a fifth embodiment of the present invention.
Figure 13:
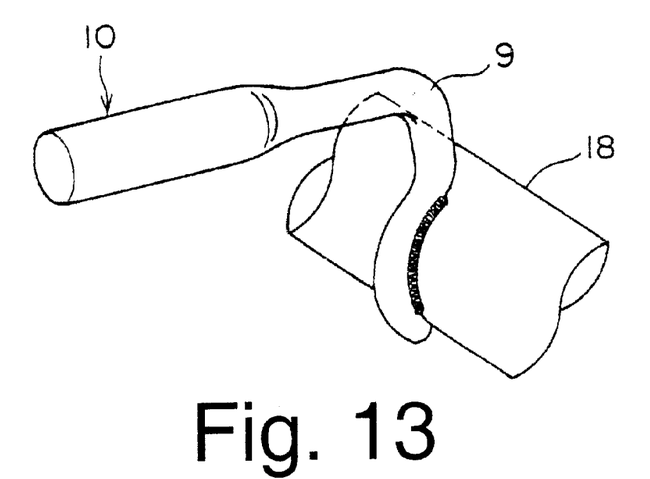
FIG. 13 is a perspective view of a portion of an exhaust pipe coupled to an exhaust bracket that is used with the vehicle body bracket shown in FIG. 12 in accordance with the fifth embodiment of the present invention.

Referring now to FIGS. 12 and 13, an exhaust system support structure in accordance with a fifth embodiment will now be explained. In view of the similarity between the first and fifth embodiments, the parts of the fifth embodiment that are substantially identical to the parts of the first embodiment will be given the same reference numerals as the parts of the first embodiment. Moreover, the descriptions of the parts of the fifth embodiment that are substantially identical to the parts of the first embodiment will be omitted for the sake of brevity.

The vehicle body bracket 1 and the vibration insulating member 5 are almost the same in this fifth embodiment as in the first embodiment, but the housing part or passage 8 of the vibration insulating member 5 is elliptical. Likewise, the engaging part 10 has an elliptical cross section formed on the forward end of the exhaust bracket 9, which is mounted to the exhaust pipe 18. Thus, the engaging part 10 of the exhaust bracket 9, which has an elliptical cross section, is housed in the elliptical housing part or passage 8 of the vibration insulating member 5 such that the exhaust bracket 9, i.e., the exhaust system, is mounted to the vibration insulating member 5. Here again, since the engaging part 10 of the exhaust bracket 9 engages with the elliptical housing part 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Sixth Embodiment

Figure 14:
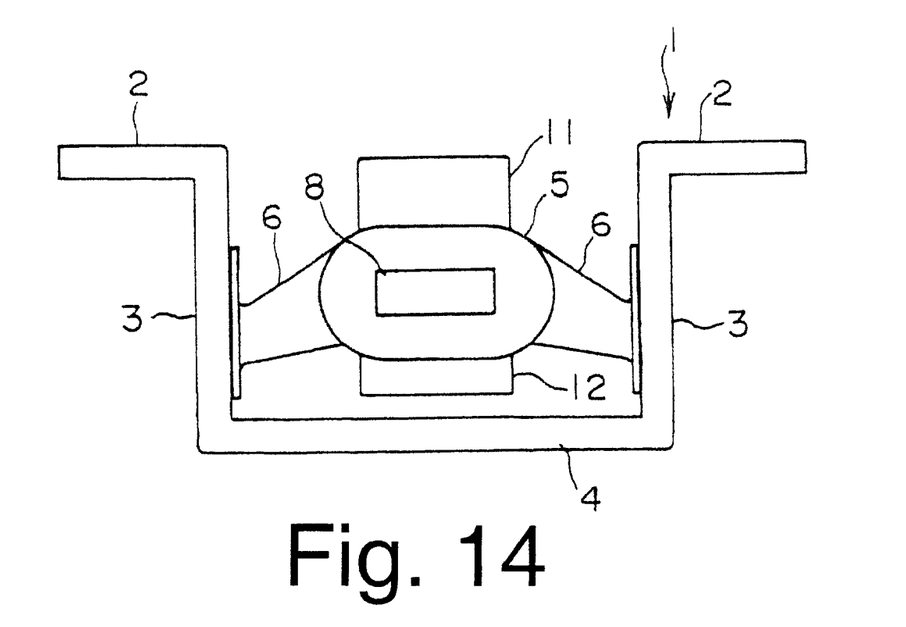
FIG. 14 is a front elevational view of a vehicle body bracket of an exhaust system support structure in accordance with a sixth embodiment of the present invention.
Figure 15:
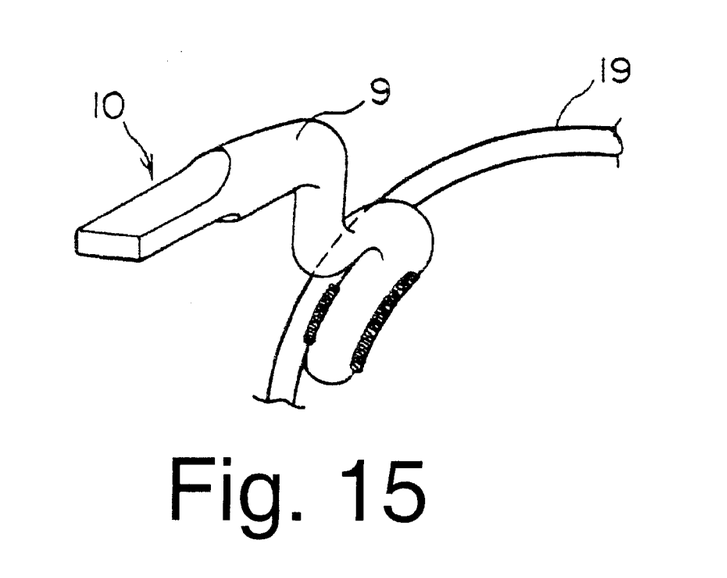
FIG. 15 is a perspective view of a portion of a silencer coupled to an exhaust bracket that is used with the vehicle body bracket shown in FIG. 14 in accordance with the sixth embodiment of the present invention.

Referring now to FIGS. 14 and 15, an exhaust system support structure in accordance with a sixth embodiment will now be explained. In view of the similarity between the first and sixth embodiments, the parts of the sixth embodiment that are substantially identical to the parts of the first embodiment will be given the same reference numerals as the parts of the first embodiment. Moreover, the descriptions of the parts of the sixth embodiment that are substantially identical to the parts of the first embodiment will be omitted for the sake of brevity.

The vehicle body bracket 1 and the vibration insulating member 5 are almost the same in this sixth embodiment as in the first embodiment, but the housing part or passage 8 of the vibration insulating member 5 is rectangular. Likewise, the engaging part 10 has a rectangular cross section formed on the forward end of the exhaust bracket 9, which is mounted to the silencer 19. Thus, the engaging part 10 of the exhaust bracket 9, which has a rectangular cross section, is housed in the rectangular housing part 8 of the vibration insulating member 5 such that the exhaust bracket 9, i.e., the exhaust system, is mounted to the vibration insulating member 5. Here again, since the engaging part 10 of the exhaust bracket 9 engages with the rectangular housing part 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Seventh Embodiment

Figure 16:
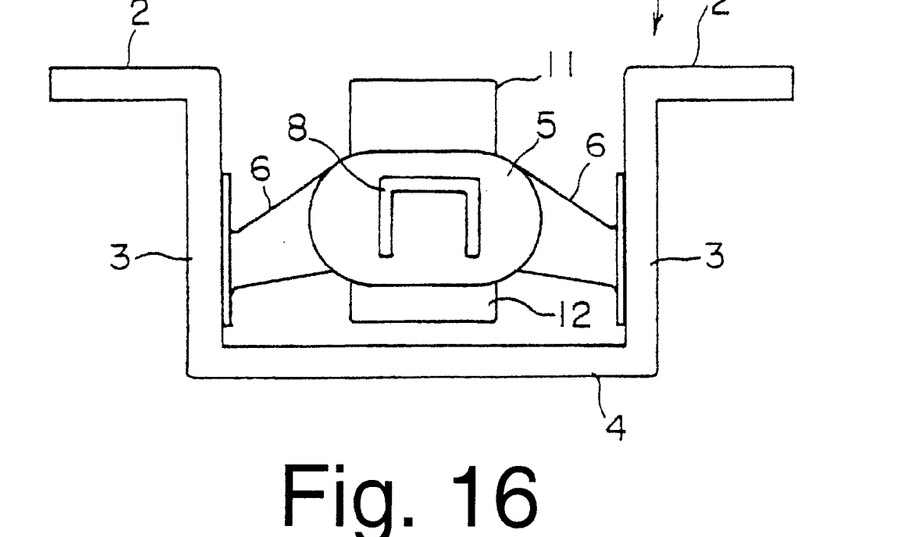
FIG. 16 is a front elevational view of a vehicle body bracket of an exhaust system support structure in accordance with a seventh embodiment of the present invention.
Figure 17:
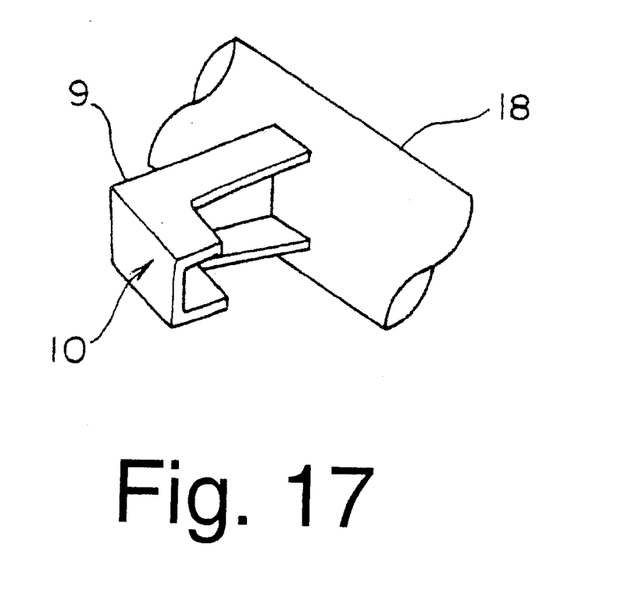
FIG. 17 is a perspective view of a portion of an exhaust pipe coupled to an exhaust bracket that is used with the vehicle body bracket shown in FIG. 16 in accordance with the seventh embodiment of the present invention.

Referring now to FIGS. 16 and 17, an exhaust system support structure in accordance with a seventh embodiment will now be explained. In view of the similarity between the first and seventh embodiments, the parts of the seventh embodiment that are substantially identical to the parts of the first embodiment will be given the same reference numerals as the parts of the first embodiment. Moreover, the descriptions of the parts of the seventh embodiment that are substantially identical to the parts of the first embodiment will be omitted for the sake of brevity.

The vehicle body bracket 1 and the vibration insulating member 5 are almost the same in this seventh embodiment as in the first embodiment, but the housing part or passage 8 of the vibration insulating member 5 is rectangular U-shaped. Likewise, the engaging part 10 has a rectangular U-shaped cross section is formed on the lateral end of the exhaust bracket 9, which is mounted to exhaust pipe 18. Thus, the engaging part 10 of the exhaust bracket 9, which has a rectangular U-shaped cross section, is housed in the rectangular U-shaped housing part 8 of the vibration insulating member 5 such that the exhaust bracket 9, i.e., the exhaust system, is mounted to the vibration insulating member 5. Here again, since the engaging part 10 of the exhaust bracket 9 engages with the rectangular U-shaped housing part 8 of the vibration insulating member 5, rotational displacement of the exhaust bracket 9 with respect to the vibration insulating member 5 is prevented. Consequently, undulation of the exhaust system can be prevented. Additionally, since the first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

Eighth Embodiment

Figure 18:
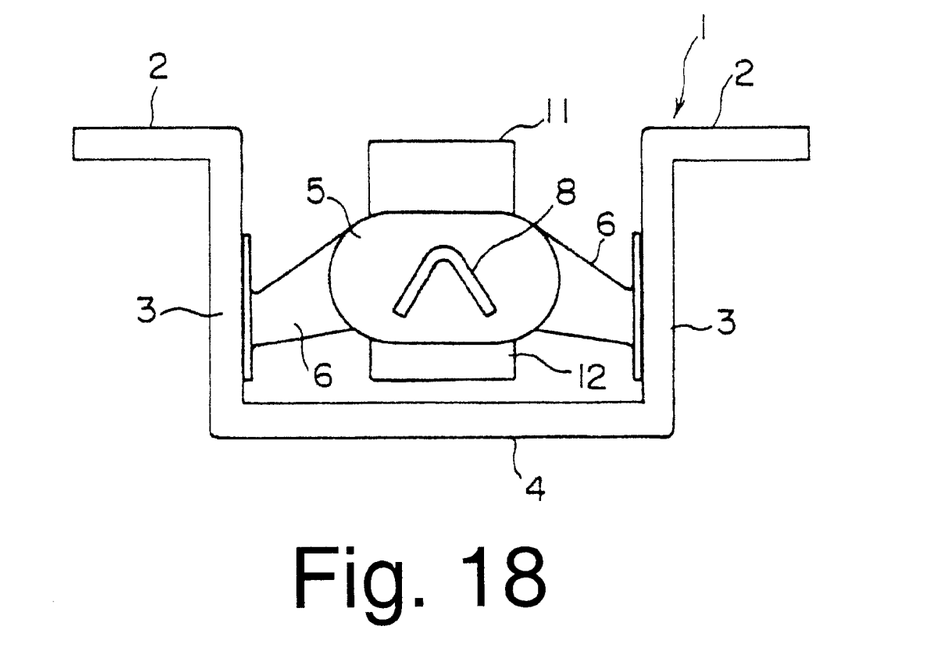
FIG. 18 is a front elevational view of a vehicle body bracket of an exhaust system support structure in accordance with an eighth embodiment of the present invention.
Figure 19:
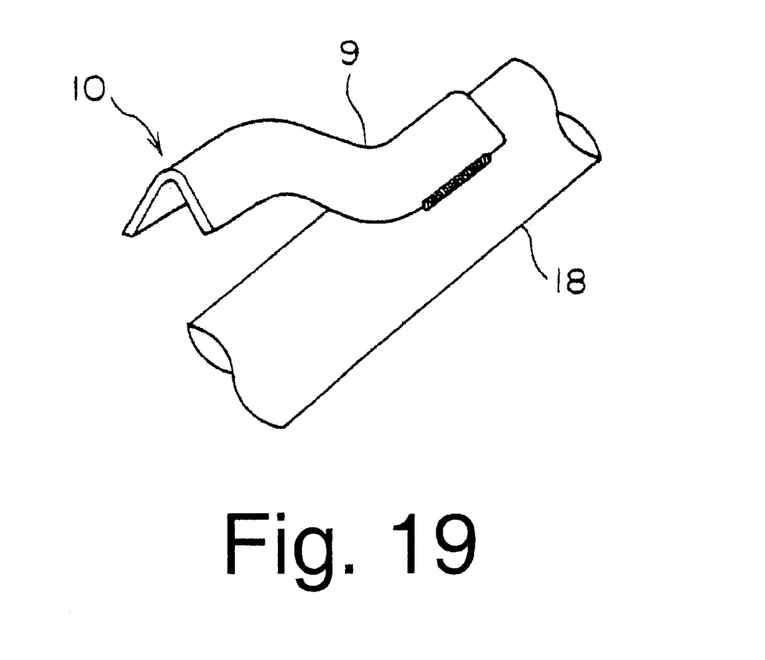
FIG. 19 is a perspective view of a portion of an exhaust pipe coupled to an exhaust bracket that is used with the vehicle body bracket shown in FIG. 18 in accordance with the eighth embodiment of the present invention.

Referring now to FIGS. 18 and 19, an exhaust system support structure in accordance with an eighth embodiment will now be explained. In view of the similarity between the first and eighth embodiments, the parts of the eighth embodiment that are substantially identical to the parts of the first embodiment will be given the same reference numerals as the parts of the first embodiment. Moreover, the descriptions of the parts of the eighth embodiment that are substantially identical to the parts of the first embodiment will be omitted for the sake of brevity.

The vehicle body bracket 1 and the vibration insulating member 5 are almost the same in this eighth embodiment as in the first embodiment, but the housing part or passage 8 of the vibration insulating member 5 is V-shaped. Likewise, the engaging part 10 has a V-shaped cross section formed on the forward end of the exhaust bracket 9, which is mounted to the exhaust pipe 18. Thus, the engaging part 10 of the exhaust bracket 9, which has a V-shaped cross section, is housed in the V-shaped housing part 8 of the vibration insulating member 5 such that the exhaust bracket 9, i.e., the exhaust system, is mounted to the vibration insulating member 5. Here again, since the engaging part 10 of the exhaust bracket 9 engages with the V-shaped housing part 8 of the vibration insulating member 5, rotational displacement of the exhaust bracket 9 with respect to the vibration insulating member 5 is prevented. Consequently, undulation of the exhaust system can be prevented. Additionally, since first and second regulating bodies 11 and 12 can suppress vibrational displacement of the vibration insulating member 5, declination of the durability of the vibration insulating member 5 can be suppressed and effects on the locations where the vibration insulating member 5 and the vehicle body bracket 1 are attached together can be suppressed. If the vehicle body bracket 1 and the vibration insulating member 5 are mounted to the vehicle body member 20 such that the pair of support parts 3 line up in the traverse direction of the vehicle, the exhaust system can be effectively prevented from undulating in the traverse direction and also prevented from undulating in a rotational manner about a center at the location where the exhaust system is mounted to the vibration insulating member 5.

As seen in FIG. 20, the vehicle body bracket 1 can be formed of two pieces that are fixedly coupled together. In particular, the support parts 3 and the linking part 4 is formed from a first piece of sheet material that is bent into a rectangular box shaped member. A second piece of sheet material is attached to the upper side of the rectangular box shaped member to form the end flanges 2. The insulator or vibration insulating member 5 is mounted between the side the support parts 3 in the same manner as the prior embodiments. Here, the support parts 3 are formed by the lateral sides of the box shaped member. The linking part 4 extends between the lower ends of the lateral sides of the box shaped member forming the support parts 3. Incidentally, as shown in FIG. 20, the bolt holes 7 are formed in the aforementioned base parts 2 for the purpose of fixing the bracket to the vehicle body member 20.

The form of the engagement between the housing part 8 of the vibration insulating member 5 and the engaging part 10 of the exhaust bracket 9 is not limited to the forms described previously. In short, any engagement form can be used so long as the exhaust bracket 9 cannot undergo rotational displacement with respect to the vibration insulating member 5 when one end of the exhaust bracket 9 is inserted into and housed in the housing part 8 of the vibration insulating member 5.

The form by which the vibration insulating member 5 is mounted to the support parts 3 is also not limited to the forms described previously. In short, any mounting form can be used so long as an arrangement in which the vibration insulating member 5 is held between the support parts 3 of the vehicle body bracket 1.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-033643. The entire disclosure of Japanese Patent Application No. 2001-033643 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust system support structure, comprising:
a vehicle body bracket including a base part configured to be coupled to a vehicle body member and a pair of support parts extending from the base part;
a vibration insulating member having connecting parts coupled between the support parts of the vehicle body bracket to substantially prevent the vibration insulating member from undulating in a rotational direction relative to the vehicle body bracket; and
an exhaust bracket including a first end coupled to the vibration insulating member and a second end configured to be coupled to an exhaust system member,
the vibration insulating member including a housing part that houses the first end of the exhaust bracket.

2. The exhaust system support structure as recited in claim 1, wherein
the vehicle body bracket further includes a linking part coupled to the support parts on a side of the vibration insulating member that remote from the base part.

3. The exhaust system support structure as recited in claim 2, wherein
the vibration insulating member further includes a regulating body protruding towards the linking part.

4. The exhaust system support structure as recited in claim 1, wherein
the base part is defined by a pair of sections that are laterally separated and extend outwardly in opposite lateral directions relative to the vibration insulating member.

5. The exhaust system support structure as recited in claim 1, wherein
the base part is further configured and arranged to extend between the support parts and extend outwardly in opposite lateral directions relative to the vibration insulating member.

6. An exhaust system support structure, comprising:
a vehicle body bracket including a base part configured to be coupled to a vehicle body member and a pair of support parts extending from the base part;
a vibration insulating member coupled between the support parts of the vehicle body bracket; and
an exhaust bracket including a first end coupled to the vibration insulating member and a second end configured to be coupled to an exhaust system member,
the vibration insulating member including a housing part that houses the first end of the exhaust bracket and a first regulating body protruding from the vibration insulating member towards the vehicle body member.

7. The exhaust system support structure as recited in claim 6, wherein
the vehicle body bracket further includes a linking part coupled to the support parts on a side of the vibration insulating member that remote from the base part.

8. The exhaust system support structure as recited in claim 7, wherein
the vibration insulating member further includes a second regulating body protruding towards the linking part.

9. The exhaust system support structure as recited in claim 8, wherein
the first end of the exhaust bracket is shaped to engage an inner surface of the housing part of the vibration insulating member.

10. An exhaust system support structure, comprising:
a vehicle body bracket including a base part configured to be coupled to a vehicle body member and a pair of support parts extending from the base part;
a vibration insulating member coupled between the support parts of the vehicle body bracket; and
an exhaust bracket including a first end coupled to the vibration insulating member and a second end configured to be coupled to an exhaust system member,
the vibration insulating member including a housing part that houses the first end of the exhaust bracket
the first end of the exhaust bracket is shaped to engage an inner surface of the housing part of the vibration insulating member.

11. The exhaust system support structure as recited in claim 10, wherein
the vibration insulating member further includes a first regulating body protruding from the vibration insulating member towards the vehicle body member.

12. The exhaust system support structure as recited in claim 11, wherein
the vehicle body bracket further includes a linking part coupled to the support parts on a side of the vibration insulating member that remote from the base part.

13. The exhaust system support structure as recited in claim 12, wherein
the vibration insulating member further includes a second regulating body protruding towards the linking part.

14. The exhaust system support structure as recited in claim 10, wherein
the vehicle body bracket further includes a linking part coupled to the support parts on a side of the vibration insulating member that remote from the base part.

15. The exhaust system support structure as recited in claim 14, wherein
the vibration insulating member further includes a regulating body protruding towards the linking part.

16. The exhaust system support structure as recited in claim 10, wherein
the first end of the exhaust bracket has a non-circular shape to engage the inner surface defined by a non-circular shaped passage of the housing part.

17. An exhaust system support structure, comprising:
vehicle body mounting means for fixedly coupling to a vehicle body member, the vehicle body mounting means including a pair of spaced apart insulator supporting means;
exhaust mounting means for fixedly coupling to an exhaust system member; and
insulating means for insulating vibrations between the vehicle body mounting means and the exhaust mounting means,
the insulating means being coupled between the pair of spaced apart insulator supporting means to support the exhaust system member such that tensile forces acting on the insulating means are shared by the pair of spaced apart insulator supporting means,
the insulating means including a first regulating body protruding from the insulating means towards the vehicle body member.

18. A method of supporting an exhaust system support structure, comprising:
fixedly coupling a vehicle body bracket to a vehicle body member of a vehicle by a base part of the vehicle body bracket;
fixedly coupling an vibration insulating member between a pair of support parts of the vehicle body bracket extending from the base part of the vehicle body bracket;
fixedly coupling a first end of an exhaust bracket to a housing part of the vibration insulating member to support the exhaust bracket such that tensile forces acting on the vibration insulating member are shared by the support parts of the vehicle body bracket; and
regulating substantial vibrational displacement of the vibration insulating member by a first regulating body protruding from the vibration insulating member towards the vehicle body member.

19. The method as recited claim 18, wherein
the vehicle body bracket is mounted to the vehicle body member in such a manner that the support parts line up in a traverse direction of the vehicle.

* * * * *